(No Model.)
A. E. MILLER.
LAWN MOWER.
No. 492,941. Patented Mar. 7, 1893.
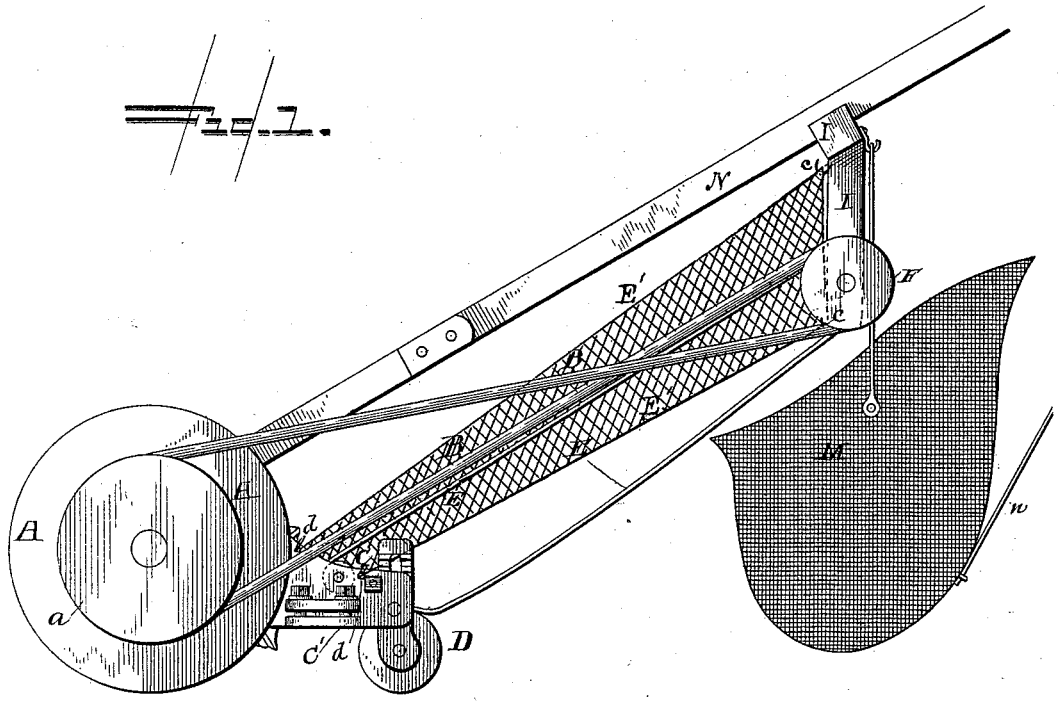
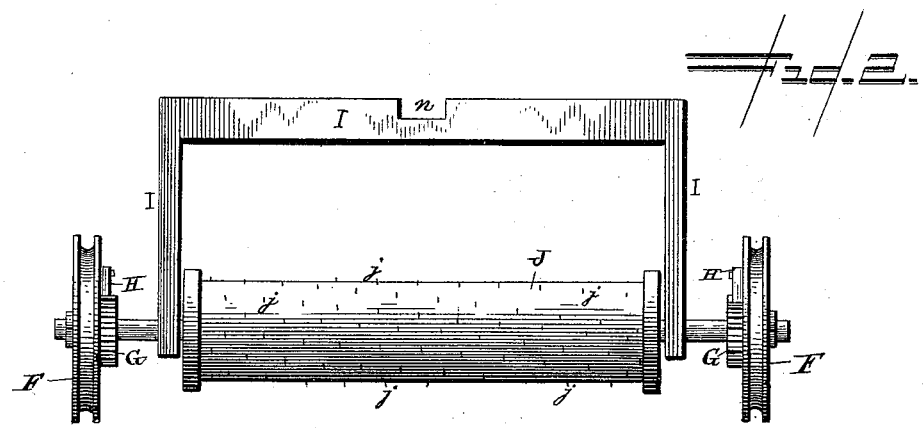
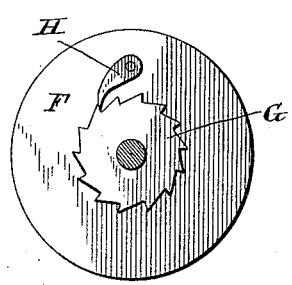
WITNESSES
J. L. Ourand
W. H. Singleton
INVENTOR
Amos E. Miller
by Wm. R. Singleton Attorney

UNITED STATES PATENT OFFICE.

AMOS E. MILLER, OF PALMYRA, NEW JERSEY.

LAWN-MOWER.

SPECIFICATION forming part of Letters Patent No. 492,941, dated March 7, 1893.

Application filed June 19, 1891. Renewed August 23, 1892. Serial No. 443,861. (No model.)

*To all whom it may concern:*

Be it known that I, AMOS E. MILLER, a citizen of the United States, residing at Palmyra, in the county of Burlington and State of New Jersey, have invented certain new and useful Improvements in Lawn-Mowers; and I do hereby declare the following to be a full, clear, and exact description of the invention, such as will enable others skilled in the art to which it appertains to make and use the same.

This invention relates to improvements in lawn mowers, which will be hereinafter more particularly described and pointed out.

In the accompanying drawings forming part of this specification: Figure 1 is a side view of the machine. Fig. 2 is a side view of the upper roller and pulleys. Fig. 3 is a side view of one of the pulleys with the ratchet and pawl.

In this machine there is a ground roller A. on each side, having on the outside a pulley a. The object in having two pulleys and two belts is to keep the machine in motion when the short turns are made, either to the right or left. In other machines the grass is clogged at the bottom of the carrier, when the turns are made on the roller having no pulley.

B is a belt which connects the pulley, a, with the upper pulley, F, on each side of the machine.

C is a small roller pivoted in the frame, C'.

D is a small ground roller.

E is a wide endless carrier made of wire or net-work which passes around the roller, C, the upper roller, J, and over the top of the small ground roller, D. On each side of the carrier, extending from above the roller, C, to the hanger, I, there is a guard net, E', on each side, which is supported at the upper end by hooks c c, on the hanger I; and at the lower end, by cords passed through holes d, d in the roller frame, as shown in Fig. 1, which prevents the cut grass from falling out sidewise as the carrier, E, takes it up to be dumped into the basket, M.

G and H are ratchet wheels and pawls on the pulleys, F, allowing motion in one direction and stopping the carrier, when the mower is reversed.

I represents the hanger by which the roller, J, and pulleys, F F, are sustained; the hanger, I, is secured to the handle, N, in the notch, n, by a screw bolt, not shown.

J is the roller over which the carrier, E, is turned to dump the cut grass and its surface is supplied with a series of points, j, which take hold of the net-work of carrier, E, to move it along.

M is a basket into which the grass is dumped.

n is a rod by which the basket is tilted, when desired to empty it.

I claim—

1. In a lawn mower the two ground rollers each having a pulley and belt in combination with the pulleys on the upper roller supplied with ratchets and pawls—substantially as and for the purpose described.

2. In a lawn mower, the combination of the ground rollers, A, having pulleys, a, the belts, B, pulleys, F, having attached thereto ratchet wheels, G, and pawls, H, the roller, J, supplied with points, j, the endless grass carrier, E, protected by side guards, E', the small pulley, C, and receptacle, M, substantially as described.

In testimony whereof I affix my signature in presence of two witnesses.

AMOS E. MILLER.

Witnesses:
W. H. DEALY,
MARTIN D. CHAMBERLAIN.